United States Patent
Chugh et al.

(10) Patent No.: US 12,505,280 B2
(45) Date of Patent: Dec. 23, 2025

(54) TAILORED EFFECTS FOR TEXT IN SOCIAL MEDIA AND DOCUMENTS

(71) Applicant: Google LLC, Mountain View, CA (US)

(72) Inventors: Tushar Chugh, Sunnyvale, CA (US); Aditya Mone, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 263 days.

(21) Appl. No.: 18/144,624

(22) Filed: May 8, 2023

(65) Prior Publication Data

US 2024/0378369 A1    Nov. 14, 2024

(51) Int. Cl.
*G06F 40/166* (2020.01)
*G06F 3/0482* (2013.01)
*G06F 3/04847* (2022.01)
*G06F 40/40* (2020.01)

(52) U.S. Cl.
CPC ......... *G06F 40/166* (2020.01); *G06F 3/0482* (2013.01); *G06F 3/04847* (2013.01); *G06F 40/40* (2020.01)

(58) Field of Classification Search
CPC .. G06F 40/166; G06F 3/0482; G06F 3/04847; G06F 40/40; G06F 40/30; G06F 40/56
See application file for complete search history.

(56) References Cited

U.S. PATENT DOCUMENTS

| | | | |
|---|---|---|---|
| 8,605,297 B2 | 12/2013 | Nielsen et al. | |
| 2006/0109378 A1 | 5/2006 | Yang et al. | |
| 2014/0278370 A1* | 9/2014 | Chen | G06F 40/30 704/9 |
| 2017/0039174 A1* | 2/2017 | Strope | G06F 40/166 |
| 2018/0061421 A1* | 3/2018 | Sarikaya | G10L 15/22 |
| 2021/0264109 A1* | 8/2021 | Srinivasan | G06F 40/44 |
| 2022/0138402 A1* | 5/2022 | Kraus | G06N 3/08 715/269 |

(Continued)

OTHER PUBLICATIONS

Nayak, Pandu , "MUM: A new AI milestone for understanding information", https://blog.google/products/search/introducing-mum/, retrieved from the internet on Apr. 6, 2023, pp. 1-4.

(Continued)

*Primary Examiner* — Stella L. Woo
(74) *Attorney, Agent, or Firm* — Botos Churchill IP Law LLP

(57) ABSTRACT

The technology relates to applying specific (tailored) effects to captions for images. The text used to describe an image can be paraphrased or recast in a particular style based on an effect selected by a user. For instance, the user may create a baseline caption for an image on a social media feed. The process may include the system identifying an initial text caption associated with an image presented in a graphical user interface of an application and determining a filter effect to be applied to the initial text caption. The process can then apply the filter effect to a trained large language model to generate one or more textual variations of the initial text caption. Then the process may transmit the one or more textual variations for display along with the image, wherein the one or more textual variations are configured to replace display of the initial text caption.

21 Claims, 16 Drawing Sheets

(56) References Cited

U.S. PATENT DOCUMENTS

| | | | | |
|---|---|---|---|---|
| 2023/0137209 A1* | 5/2023 | Nangi | ............ | G06F 40/166 |
| | | | | 704/9 |
| 2023/0259713 A1* | 8/2023 | Religa | ............ | G06N 20/00 |
| | | | | 704/9 |
| 2023/0394855 A1* | 12/2023 | Xie | ............ | G06F 40/40 |

OTHER PUBLICATIONS

Pichai, Sundar, "An important next step on our AI journey", Google AI updates: Bard and new AI features in Search, https://blog.google/technology/ai/bard-google-ai-search-updates/, retrieved from the internet on Apr. 6, 2023.

* cited by examiner

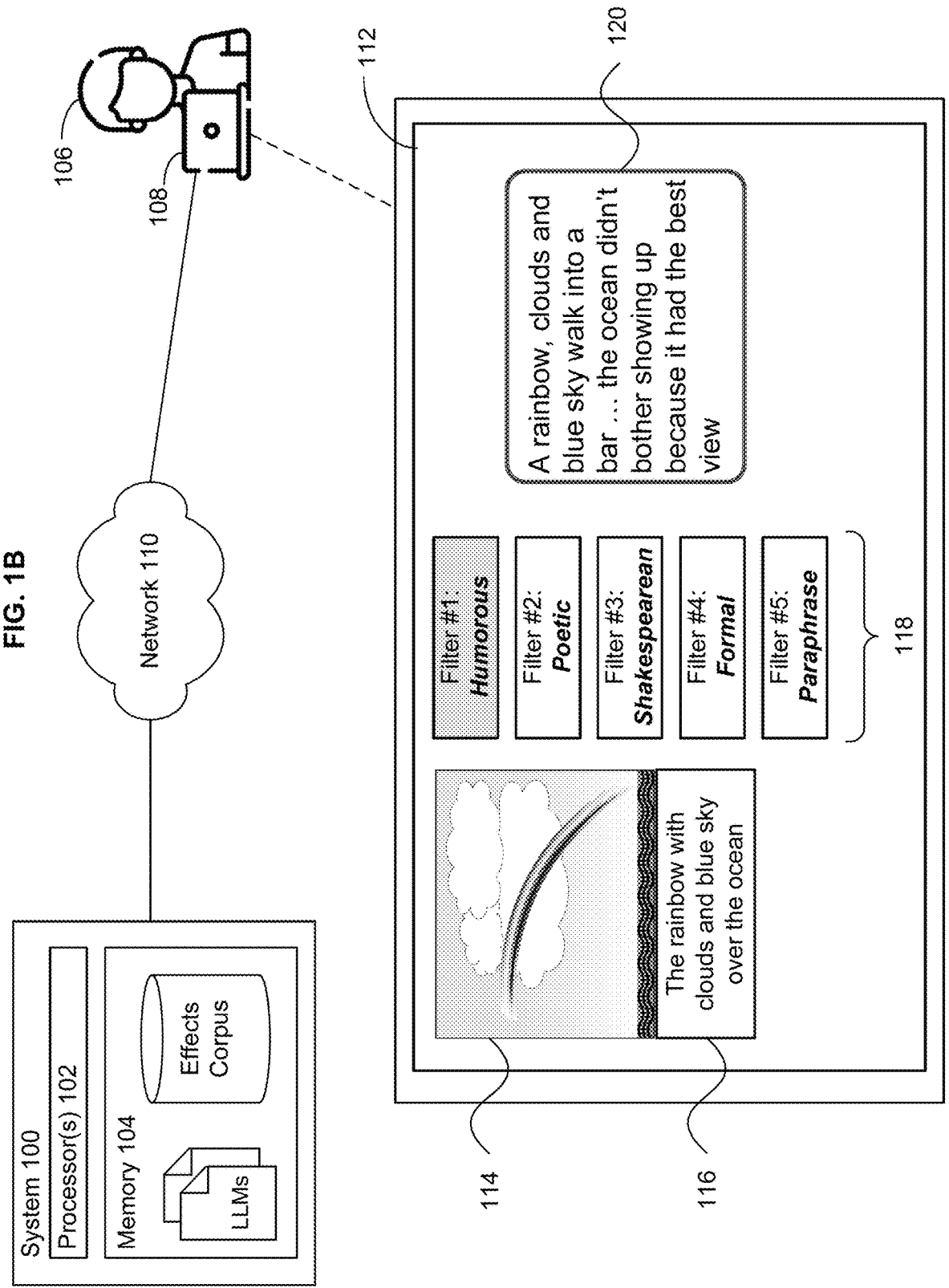

FIG. 1C

Caption Options

The rainbow with clouds and blue sky over the ocean

Filter #1: *Humorous*

Filter #2: *Poetic*

Filter #3: *Shakespearean*

Filter #4: *Formal*

Filter #5: *Paraphrase*

Caption Outputs

Humorous
*A rainbow, clouds, and blue sky walk into a bar...the ocean didn't bother showing up because it already had the best view.*

Poetic
*Behold, a wondrous sight to see,*
*The rainbow with clouds, so majestically,*
*Adorns the canvas of the sky,*
*Over the ocean, with its gentle sigh.*

*A burst of colors, a symphony of hues,*
*Spanning the heavens, with its vibrant views,*
*An arc of beauty, a radiant display,*
*Guiding us to a brighter day.*

Shakespearean
*Hark! Witness a marvel most fine,*
*The rainbow 'gainst clouds, in glory to shine,*
*Doth grace the canvas of yon sky,*
*O'er ocean blue with gentle sigh.*

*A burst of colors, a symphony rare,*
*O'er heaven's expanse, with hues most fair,*
*An arc of beauty, a radiant array,*
*To lead us forth to a brighter day.*

Formal
*The clouds were billowing in the sky, their fluffy white forms casting shadows over the ocean. The sun shone brightly overhead, its rays reflecting off the water's surface. In the distance, a rainbow could be seen, its colors glistening in the sunlight.*

Paraphrase
*A rainbow can be seen in the sky above the ocean, amidst clouds and a backdrop of blue skies.*

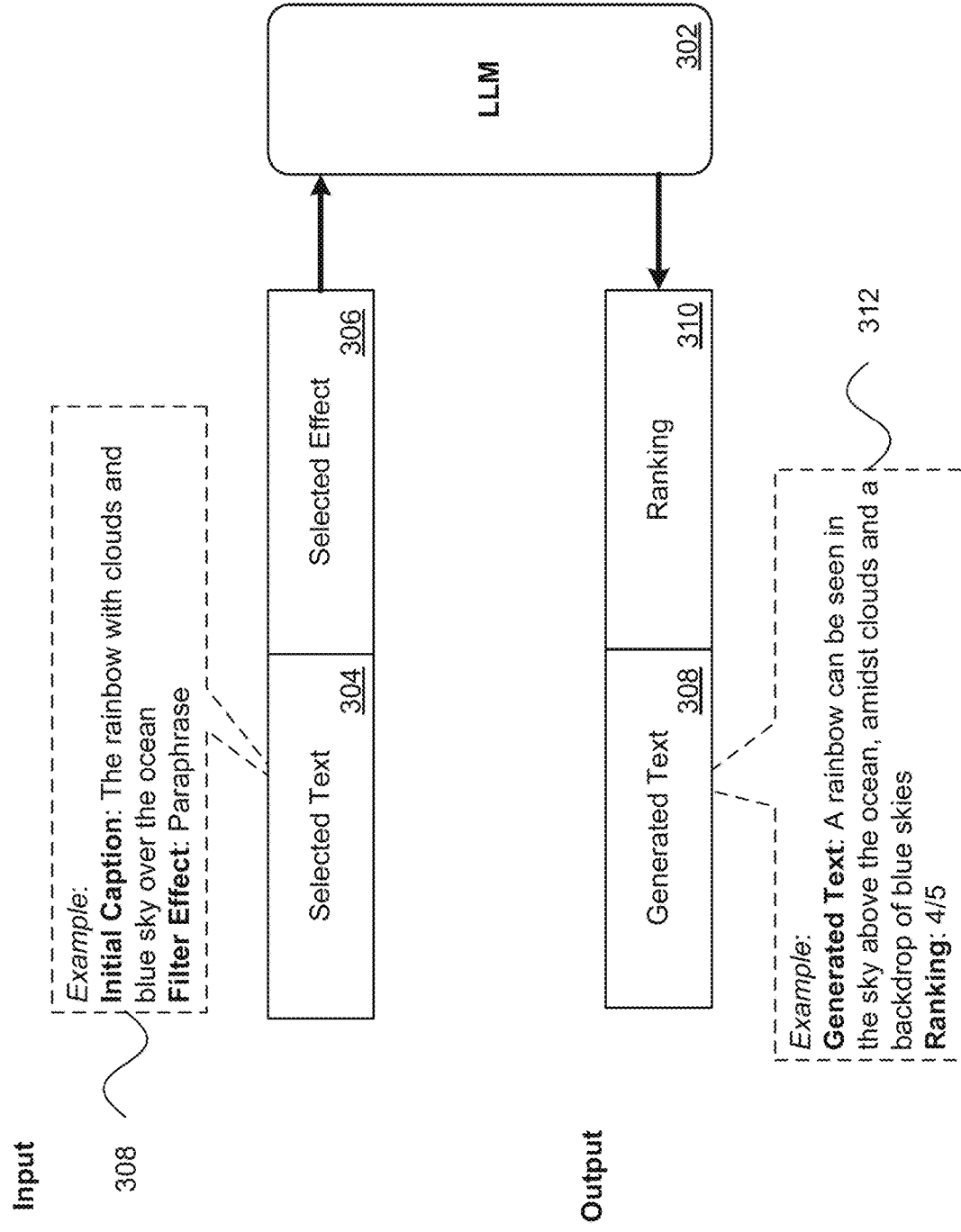

FIG. 7B

Project Team — 722

Chat  Emails  Texts  Videoconference  Files

Jonny — Does anyone know where the updated files have been moved to?

Karli — Just a reminder that we are meeting today to discuss the presentation.

Adar — Good idea – Johnny, are you still available to handle?

Lexi — How can I help?

Steve — Look in the shared network folder

Nathaniel — Great idea! Let's get this going ASAP and let everyone know what they need to do

Rusti — I'll jump right on it!

*Team Chat Message* — 726

728

724

730 — [image of rainbow over ocean]

732 — *A rainbow can be seen in the sky above the ocean, amidst clouds and a backdrop of blue skies.*

736 —
Paraphrase
Poetic
Humorous
Shakespearean
Summarize

734 — ↶ ↷ | Ariel ▼ | tT | B I U | Effects

Post — 738

720

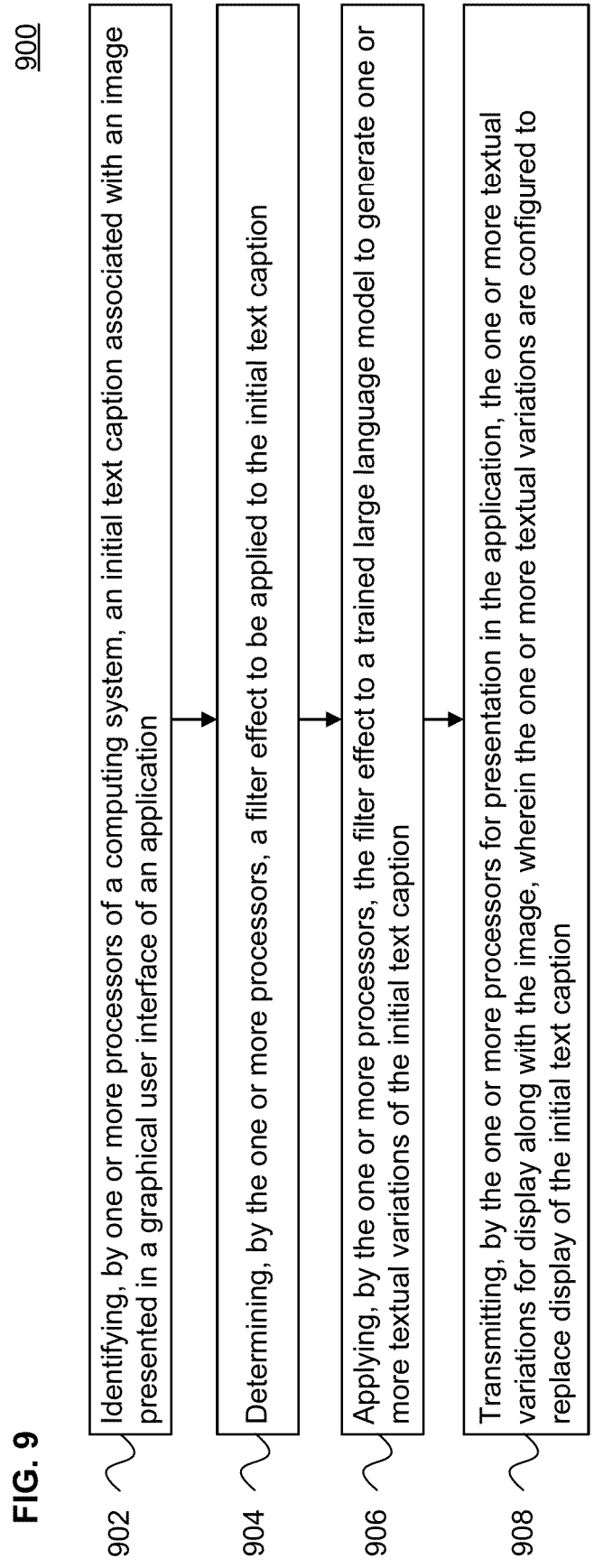

TAILORED EFFECTS FOR TEXT IN SOCIAL MEDIA AND DOCUMENTS

BACKGROUND

Effective written communication is important in many areas, including workplace communication, school assignments, emails and social media posts. While some people have a natural talent for writing, other people may struggle to convey their thoughts in writing. One area that can be challenging involves paraphrasing content of documents, emails, chats or posts to make sure the ideas are conveyed fully but concisely. Another area is writing content for social media to achieve better user engagement. And another area may be expressing emotions about a topic via a poem or a song. While various software tools may aid people in their writing, they may be focused on grammar or other writing issues without helping the user to effectively communicate in writing. In addition, such tools may be constrained to textual features and may be unable to provide suitable recommendations involving multimedia content. In contrast, filters and effects may be applied to images, such as in social media posts, such as to evoke an emotion or add context.

BRIEF SUMMARY

The technology relates to applying specific (tailored) effects to captions for images. The text used to describe an image can be paraphrased or recast in a particular style based on an effect selected by a user. For instance, the user may create a baseline caption for an image on a social media feed. The system presents a set of effects to the user. Each effect would generate a different modified version of the caption. In other scenarios, the user may select an effect option for any block of text, such as when using a word processing application, a presentation application, an email application, etc. The system may present samples of all the different effects to the user for selection. Alternatively, the system may generate a score for each effect, where the scores indicate how applicable or relevant the text with that effect is to the input text, a particular style or other criteria.

According to one aspect of the technology, a computer-implemented method comprising: identifying, by one or more processors of a computing system, an initial text caption associated with an image presented in a graphical user interface of an application; determining, by the one or more processors, a filter effect to be applied to the initial text caption; applying, by the one or more processors, the filter effect to a trained large language model to generate one or more textual variations of the initial text caption; and transmitting, by the one or more processors for presentation in the application, the one or more textual variations for display along with the image, wherein the one or more textual variations are configured to replace display of the initial text caption.

The initial text caption may be identified according to one or more of text input received from a user of the application, a previously detected writing style associated with the user, and/or metadata of the image. Determining the filter effect to be applied may be based on identification of a filter selection in the graphical user interface of the application.

The filter effect may include at least one textual style from a set of distinct textual styles. The set of distinct textual styles may include at least one of a humorous style, a poetic style, a Shakespearean style, a formal style, or a paraphrase style. Alternatively or additionally, the large language model may be trained according to each distinct textual style of the set. Alternatively or additionally, the trained large language model may comprise a plurality of large language models, in which each of the plurality of large language models is trained on a different one of the set of distinct textual styles. Moreover, the filter effect may include a plurality of sub-filter effects that are variants of a general filter effect. Alternatively or additionally, the large language model may be trained or fine-tuned according to reinforcement learning using human feedback.

Alternatively or additionally to any of the above, the one or more textual variations may be a plurality of textual variations. Here, the method may further comprise ranking the plurality of textual variations. In this case, the method may further comprise generating, for presentation in the application, rankings for each of the plurality of textual variations to be displayed in the graphical user interface. Alternatively or additionally, the ranking may be performed by the large language model. Moreover, alternatively or additionally to any of the above, the method may further comprise performing post-processing on the one or more textual variations for validation prior to transmitting.

According to another aspect of the technology, a processing system comprises memory configured to store one or more of imagery, caption information or a trained large language model, and one or more processors operatively coupled to the memory. The one or more processors are configured to: identify an initial text caption associated with an image presented in a graphical user interface of an application; determine a filter effect to be applied to the initial text caption; apply the filter effect to the trained large language model to generate one or more textual variations of the initial text caption; and transmit, for presentation in the application, the one or more textual variations for display along with the image. The one or more textual variations are configured to replace display of the initial text caption.

Determination of the filter effect to be applied may be based on identification of a filter selection in the graphical user interface of the application. The filter effect may include at least one textual style from a set of distinct textual styles. Alternatively or additionally, the filter effect may include a plurality of sub-filter effects that are variants of a general filter effect. Furthermore, the one or more textual variations may comprise a plurality of textual variations. In this case, the one or more processors are further configured to rank the plurality of textual variations.

BRIEF DESCRIPTION OF THE DRAWINGS

FIGS. 1A-D illustrate an example textual effect system and sample textual effects in accordance with aspects of the technology.

FIGS. 3A-B illustrate examples of a trained system in accordance with aspects of the technology.

FIGS. 7A-B illustrate an example electronic messaging application in accordance with aspects of the technology.

FIG. 9 illustrates an example method in accordance with aspects of the technology.

DETAILED DESCRIPTION

Figure 1A:
Figure 1D:
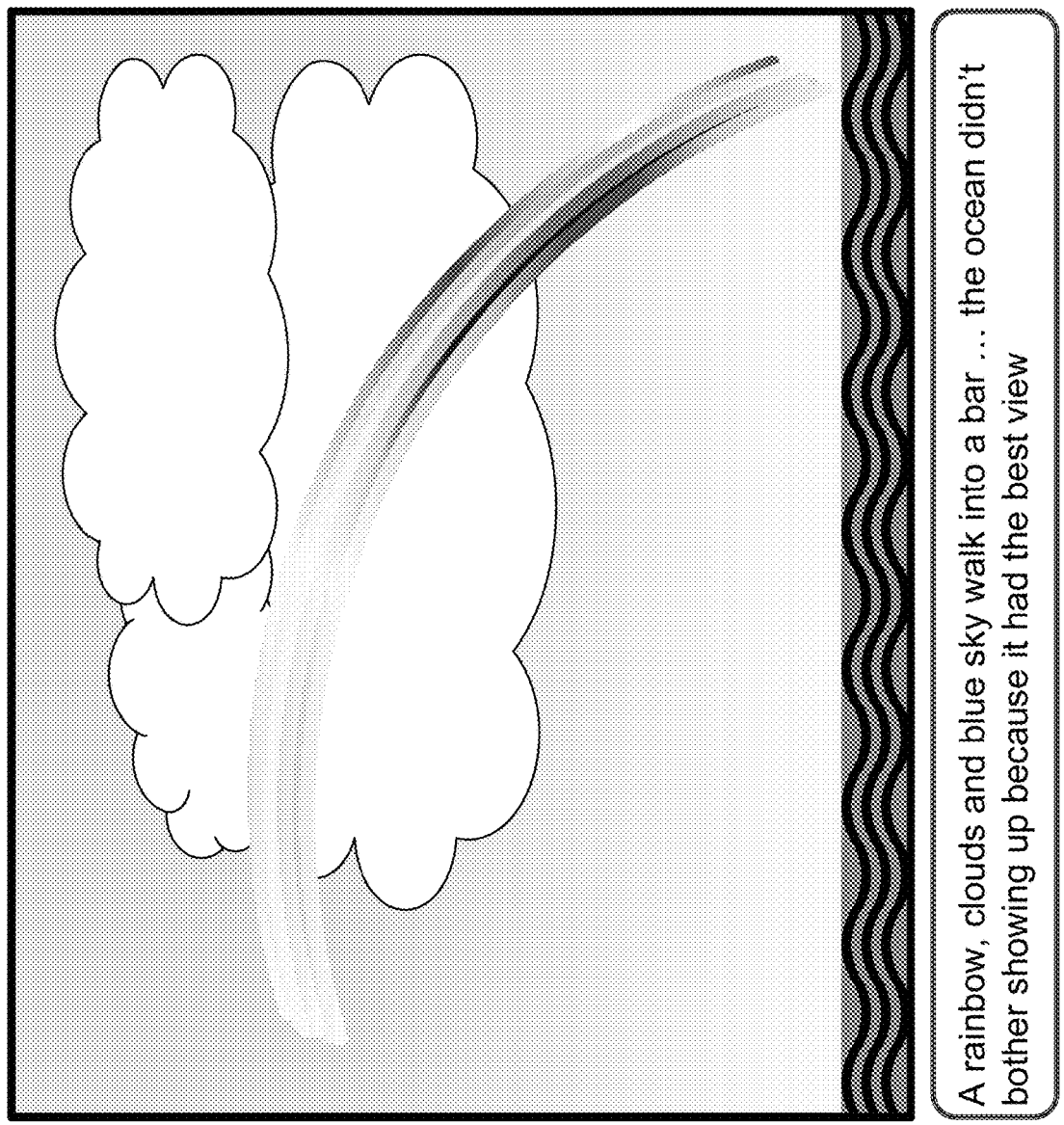

According to one aspect of the technology, a specific tailored textual effect can be applied to an image caption, such as for a photograph or other imagery. FIGS. 1A-B illustrate an example of this. As shown in FIG. 1A, there is an image, in this example of clouds and a rainbow over the water, with a blue-sky background. This image may have been taken or otherwise obtained by a user. The user may put together a caption for the image, which, e.g., may be shared in a social media post, may be included in a chat or text, a greeting card, or may be used in a presentation or other document. From this, the system is able to generate one or more textual variations, for instance based upon a set of filters provided to the user. These filters may be akin to image-like effects that could be applied to the image itself, e.g., by adding or modifying certain color tones or tints, changing the saturation and/or contrast, adding blurring, applying a sepia or black-and-white filter, etc.

FIG. 1B illustrates an example involving a textual effect system 100 for processing user input and generating one or more textual effects associated with an image caption (or for other visual content). The system 100 may include one or more processors 102 and memory 104 for storing data. In one example, the memory 104 may store one or more trained large language models (LLMs) and/or a textual effects corpus. A user 106 can formulate an image caption or other input on their client device 108, which may be, e.g., a laptop or desktop computer, a tablet PC, a mobile phone or PDA, a smartwatch or other wearable computing device, a smart home appliance, etc. The caption or other input is sent to the system 100 via a network 110. The system applies a trained LLM (or multiple LLMs) to the input in view of a textual effect corpus, interacting with the user in order to receive a selection and/or present results. The user input and system commentary may be presented via the app displayable to the user 106 on a graphical user interface (GUI) 112 of the user's client device 110.

For instance, in this scenario an image 114 has been selected, and has an initial caption 116 associated with it. By way of example, the caption may have been created by the user 106. Alternatively, for an input image or video, the multimodal LLMs can feed input directly as an image/video, such as via metadata of the of image/video, e.g., time and location, which can be used as the input in addition to the raw image/video. Or users could add explicit instructions to generate the text caption. Here, this could be a simple requirement such as length of the text (e.g., short or long), or it could be a more complex instruction such as to use elements from a particular song. Of course, the effects/filter could be selected as the basis for the captain. In another example, the caption could be associated with one or more past posts (or other information) from the user. By way of example, the system could evaluate the writing style of the user from one or more previous posts, and that style could be encoded in the user's embedding. And in another example, a user could share the kind of emotion(s) they would like to convey. Two or more of these options could be combined in any manner. The user may have the option to edit or otherwise change the information prior to filter selection.

The GUI 112 presents a set of filter options 118 to the user. Each filter option is configured to apply an LLM to transform the initial caption in a particular way in order to generate alternative captions; here, one alternative per filter. By way of example only, the filters may be: Humorous (filter #1), Poetic (filter #2), Shakespearean (filter #3), Formal (filter #4) and Paraphrase (filter #5). By way of example, these effects can be populated based on one or more of: (1) input context from the image and the text, (2) "surface"; in which documents or email could have effects such as formalize or rephrase, where social media could have poetic or humorous.; (3) user interaction from the product, such as effects that are most often used; (4) past effects selected by the user; and (5) trending filters on the platform (e.g., a top N list of filters selected by users of the platform). Some or all of these filters may be presented as options to the user. Additionally or alternatively, one or more other filters may be presented. The user may be able to select some or all of the filters. Multiple filters could be applied together, such as humorous+poetic, rap+romantic, polite+formalize, cheerful+poetic+romantic, etc. Users could also provide a filter in the form of text that is not available from the set of available filters presented by the system. An example of this is a poem with a rhyme scheme ABCB that uses the elements from the image involving humor and romance.

In the example of FIG. 1B, assume that the initial caption is "The rainbow with clouds and blue sky over the ocean". Here, the Humorous filter may generate:

A rainbow, clouds, and blue sky walk into a bar . . . the ocean didn't bother showing up because it already had the best view.

The Poetic filter may generate:
Behold, a wondrous sight to see,
The rainbow with clouds, so majestically,
Adorns the canvas of the sky,
Over the ocean, with its gentle sigh.
A burst of colors, a symphony of hues,
Spanning the heavens, with its vibrant views,
An arc of beauty, a radiant display,
Guiding us to a brighter day.

The Shakespearean filter may generate:
Hark! Witness a marvel most fine,
The rainbow 'gainst clouds, in glory to shine,
Doth grace the canvas of yon sky,
O'er ocean blue with gentle sigh.
A burst of colors, a symphony rare,
O'er heaven's expanse, with hues most fair,
An arc of beauty, a radiant array,
To lead us forth to a brighter day.

The Formal filter may generate:
The clouds were billowing in the sky, their fluffy white forms casting shadows over the ocean. The sun shone brightly overhead, its rays reflecting off the water's surface. In the distance, a rainbow could be seen, its colors glistening in the sunlight.

And the Paraphrase filter may generate:
A rainbow can be seen in the sky above the ocean, amidst clouds and a backdrop of blue skies.

In one scenario, each of these filters may be automatically applied to the input caption 116 without user action. Then, when the user selects a given filter, e.g., the Humorous filter as shown by the shading in FIG. 1B, the GUI may present that already-generated alternative caption as illustrated by text box 120. In another scenario, only the filter(s) that are selected may apply the trained model(s) to the input caption. FIG. 1C illustrates an example of the GUI that includes a set of caption options based on the input caption in a first section of the interface, and caption outputs generated by the system for each of the caption options. Note that the filters may each have one or more sub-filters. For instance, the Humorous filter include different options for, e.g., a dad joke, limerick, knock-knock joke, etc. In addition, a user could specify alternative options not present in the options provided on the app. So instead of the Formal option, the user could specify (e.g., via a text box or audio input) an Abraham Lincoln-style caption, or one in the manner of a sports play (e.g., a home run call) from a famous announcer. Multiple drafts could also be presented to the user, giving them an option to select from one of them. For example:

dad joke variation:
Why did the rainbow go to the ocean?
It wanted to see some wave-lengths.
limerick:
There once was a rainbow so bright,
It appeared in the sky one night.
It arched over the sea,
And made everyone glee,
As it shone with all its might.
knock-knock:
Knock knock.
Who's there?
Rainbow.
Rainbow who?
Rainbow over the ocean, looking for some fun!

Upon selection of a particular caption generated by the system, the system replaces the initial caption with the selected caption, which can then be integrated into a social media post, chat, presentation, etc.

EXAMPLE SYSTEMS AND METHODS

As noted above, one or more LLMs may be employed in the system 100. While there are a number of different possible system configurations, they each incorporate LLMs. According to one aspect, LLMs based on the Transformer architecture may be employed, although other architectures may be used. The arrangements discussed herein can utilize one or more encoders. In one scenario, a first encoder may be configured to process textual information from, e.g., an input caption. A second encoder may be configured to handle image-based content. Alternatively or additionally, other encoders may be configured to handle audio input, multimedia input, form-based input, etc.

Figure 2:
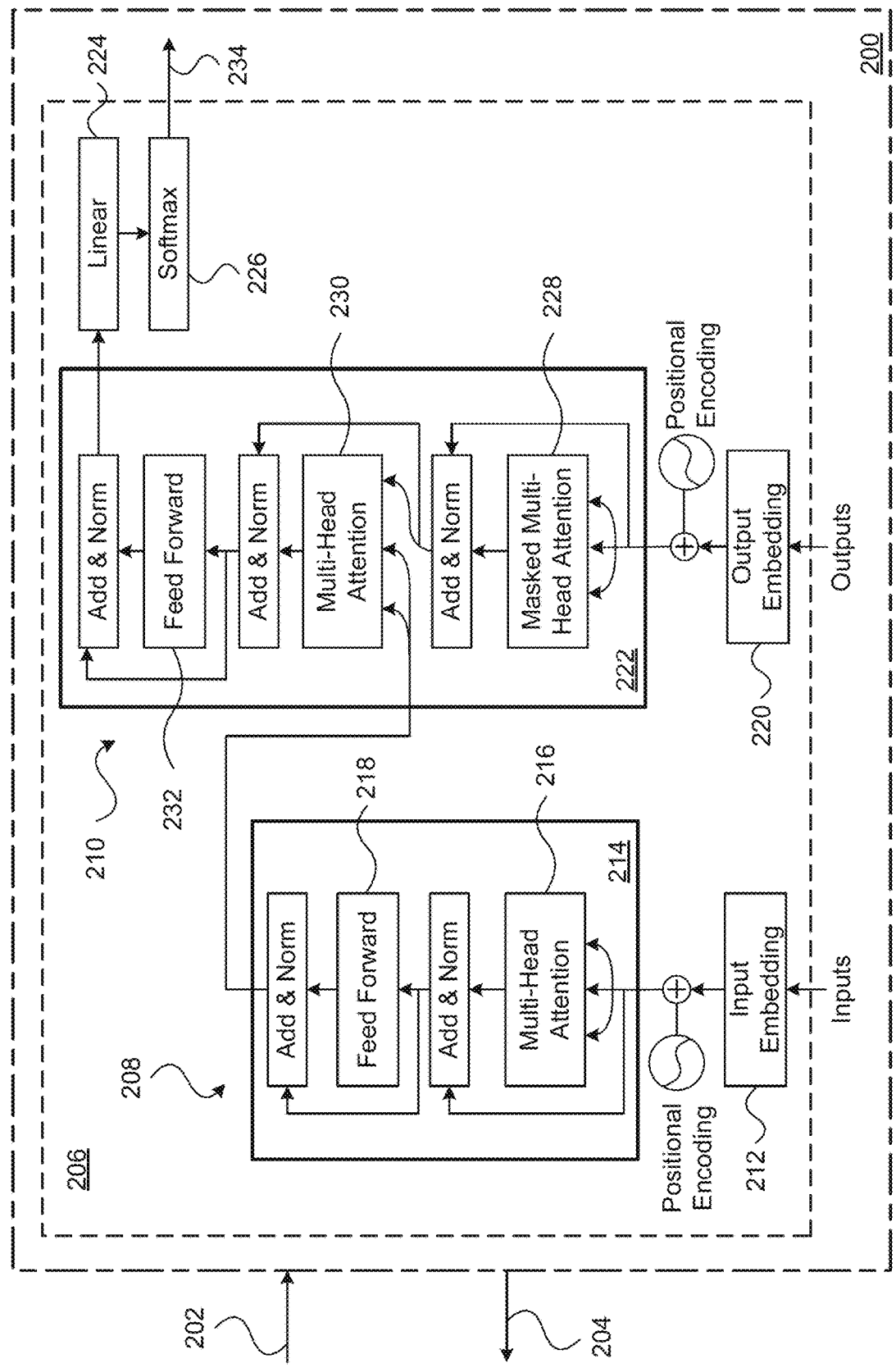
FIG. 2 illustrates a Transformer-type architecture for use in accordance with aspects of the technology.

The technology described herein shows how to harness the attributes of LLMs for, e.g., caption presentation. By way of example only, a suitable Transformer architecture is presented in FIG. 2. In particular, system 200 of FIG. 2 is implementable via a computer program by processors of one or more computers in one or more locations. The system 200 receives an input sequence 202 (e.g., a query) and processes the input sequence 202 to transduce the input sequence 202 into an output sequence 204 (e.g., an answer). The input sequence 202 has a respective network input at each of multiple input positions in an input order and the output sequence 204 has a respective network output at each of multiple output positions in an output order.

System 200 can perform any of a variety of tasks that require processing sequential inputs to generate sequential outputs. System 200 includes an attention-based sequence transduction neural network 206, which in turn includes an encoder neural network 208 and a decoder neural network 210. The encoder neural network 208 is configured to receive the input sequence 202 and generate a respective encoded representation of each of the network inputs in the input sequence. An encoded representation is a vector or other ordered collection of numeric values. The decoder neural network 210 is then configured to use the encoded representations of the network inputs to generate the output sequence 204. Generally, both the encoder 208 and the decoder 210 are attention-based. In some cases, neither the encoder nor the decoder includes any convolutional layers or any recurrent layers. The encoder neural network 208 includes an embedding layer (input embedding) 212 and a sequence of one or more encoder subnetworks 214. The encoder neural 208 network may N encoder subnetworks 214.

The embedding layer 212 is configured, for each network input in the input sequence, to map the network input to a numeric representation of the network input in an embedding space, e.g., into a vector in the embedding space. The embedding layer 212 then provides the numeric representations of the network inputs to the first subnetwork in the sequence of encoder subnetworks 214. The embedding layer 212 may be configured to map each network input to an embedded representation of the network input and then combine, e.g., sum or average, the embedded representation of the network input with a positional embedding of the input position of the network input in the input order to generate a combined embedded representation of the network input. In some cases, the positional embeddings are learned. As used herein, "learned" means that an operation or a value has been adjusted during the training of the sequence transduction neural network 206. In other cases, the positional embeddings may be fixed and are different for each position.

The combined embedded representation is then used as the numeric representation of the network input. Each of the encoder subnetworks 214 is configured to receive a respective encoder subnetwork input for each of the plurality of input positions and to generate a respective subnetwork output for each of the plurality of input positions. The encoder subnetwork outputs generated by the last encoder subnetwork in the sequence are then used as the encoded representations of the network inputs. For the first encoder subnetwork in the sequence, the encoder subnetwork input is the numeric representations generated by the embedding layer 212, and, for each encoder subnetwork other than the first encoder subnetwork in the sequence, the encoder subnetwork input is the encoder subnetwork output of the preceding encoder subnetwork in the sequence.

Each encoder subnetwork 214 includes an encoder self-attention sub-layer 216. The encoder self-attention sub-layer 216 is configured to receive the subnetwork input for each of the plurality of input positions and, for each particular input position in the input order, apply an attention mechanism over the encoder subnetwork inputs at the input positions using one or more queries derived from the encoder subnetwork input at the particular input position to generate a respective output for the particular input position. In some cases, the attention mechanism is a multi-head attention mechanism as shown. In some implementations, each of the encoder subnetworks 214 may also include a residual connection layer that combines the outputs of the encoder self-attention sub-layer with the inputs to the encoder self-attention sub-layer to generate an encoder self-attention residual output and a normalization layer that applies layer normalization to the encoder self-attention residual output. These two layers are collectively referred to as an "Add & Norm" operation in FIG. 2.

Some or all of the encoder subnetworks can also include a position-wise feed-forward layer 218 that is configured to operate on each position in the input sequence separately. In particular, for each input position, the feed-forward layer 218 is configured to receive an input at the input position and apply a sequence of transformations to the input at the input position to generate an output for the input position. The inputs received by the position-wise feed-forward layer 218 can be the outputs of the normalization layer when the residual and normalization layers are included or the outputs of the encoder self-attention sub-layer 216 when the residual and normalization layers are not included. The transformations applied by the layer 218 will generally be the same for each input position (but different feed-forward layers in different subnetworks may apply different transformations).

In cases where an encoder subnetwork 214 includes a position-wise feed-forward layer 218 as shown, the encoder subnetwork can also include a residual connection layer that combines the outputs of the position-wise feed-forward layer with the inputs to the position-wise feed-forward layer to generate an encoder position-wise residual output and a normalization layer that applies layer normalization to the encoder position-wise residual output. As noted above, these two layers are also collectively referred to as an "Add & Norm" operation. The outputs of this normalization layer can then be used as the outputs of the encoder subnetwork 214.

Once the encoder neural network 208 has generated the encoded representations, the decoder neural network 210 is configured to generate the output sequence in an auto-regressive manner. That is, the decoder neural network 210 generates the output sequence, by at each of a plurality of generation time steps, generating a network output for a corresponding output position conditioned on (i) the encoded representations and (ii) network outputs at output positions preceding the output position in the output order. In particular, for a given output position, the decoder neural network generates an output that defines a probability distribution over possible network outputs at the given output position. The decoder neural network can then select a network output for the output position by sampling from the probability distribution or by selecting the network output with the highest probability.

Because the decoder neural network 210 is auto-regressive, at each generation time step, the decoder network 210 operates on the network outputs that have already been generated before the generation time step, i.e., the network outputs at output positions preceding the corresponding output position in the output order. In some implementations, to ensure this is the case during both inference and training, at each generation time step the decoder neural network 210 shifts the already generated network outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 210 operate on data at output positions preceding the given output positions (and not on data at any other output positions), it will be understood that this type of conditioning can be effectively implemented using shifting.

The decoder neural network 210 includes an embedding layer (output embedding) 220, a sequence of decoder subnetworks 222, a linear layer 224, and a softmax layer 226. In particular, the decoder neural network can include N decoder subnetworks 222. However, while the example of FIG. 2 shows the encoder 208 and the decoder 210 including the same number of subnetworks, in some cases the encoder 208 and the decoder 210 include different numbers of subnetworks. The embedding layer 220 is configured to, at each generation time step, for each network output at an output position that precedes the current output position in the output order, map the network output to a numeric representation of the network output in the embedding space. The embedding layer 220 then provides the numeric representations of the network outputs to the first subnetwork 222 in the sequence of decoder subnetworks.

In some implementations, the embedding layer 220 is configured to map each network output to an embedded representation of the network output and combine the embedded representation of the network output with a positional embedding of the output position of the network output in the output order to generate a combined embedded representation of the network output. The combined embedded representation is then used as the numeric representation of the network output. The embedding layer 220 generates the combined embedded representation in the same manner as described above with reference to the embedding layer 212.

Each decoder subnetwork 222 is configured to, at each generation time step, receive a respective decoder subnetwork input for each of the plurality of output positions preceding the corresponding output position and to generate a respective decoder subnetwork output for each of the plurality of output positions preceding the corresponding output position (or equivalently, when the output sequence has been shifted right, each network output at a position up to and including the current output position). In particular, each decoder subnetwork 222 includes two different attention sub-layers: a decoder self-attention sub-layer 228 and an encoder-decoder attention sub-layer 230. Each decoder self-attention sub-layer 228 is configured to, at each generation time step, receive an input for each output position preceding the corresponding output position and, for each of the particular output positions, apply an attention mechanism over the inputs at the output positions preceding the corresponding position using one or more queries derived from the input at the particular output position to generate a updated representation for the particular output position. That is, the decoder self-attention sub-layer 228 applies an attention mechanism that is masked so that it does not attend over or otherwise process any data that is not at a position preceding the current output position in the output sequence.

Each encoder-decoder attention sub-layer 230, on the other hand, is configured to, at each generation time step, receive an input for each output position preceding the corresponding output position and, for each of the output positions, apply an attention mechanism over the encoded representations at the input positions using one or more queries derived from the input for the output position to generate an updated representation for the output position. Thus, the encoder-decoder attention sub-layer 230 applies attention over encoded representations while the decoder self-attention sub-layer 228 applies attention over inputs at output positions.

In the example of FIG. 2, the decoder self-attention sub-layer 228 is shown as being before the encoder-decoder attention sub-layer in the processing order within the decoder subnetwork 222. In other examples, however, the decoder self-attention sub-layer 228 may be after the encoder-decoder attention sub-layer 230 in the processing order within the decoder subnetwork 222 or different subnetworks may have different processing orders. In some implementations, each decoder subnetwork 222 includes, after the decoder self-attention sub-layer 228, after the encoder-decoder attention sub-layer 230, or after each of the two sub-layers, a residual connection layer that combines the outputs of the attention sub-layer with the inputs to the attention sub-layer to generate a residual output and a normalization layer that applies layer normalization to the residual output. These two layers being inserted after each of the two sub-layers, both referred to as an "Add & Norm" operation.

Some or all of the decoder subnetwork 222 also include a position-wise feed-forward layer 232 that is configured to operate in a similar manner as the position-wise feed-forward layer 218 from the encoder 208. In particular, the layer 232 is configured to, at each generation time step: for each output position preceding the corresponding output position: receive an input at the output position, and apply a sequence of transformations to the input at the output position to generate an output for the output position. The inputs received by the position-wise feed-forward layer 232 can be the outputs of the normalization layer (following the last attention sub-layer in the subnetwork 222) when the residual and normalization layers are included or the outputs of the last attention sub-layer in the subnetwork 222 when the residual and normalization layers are not included. In cases where a decoder subnetwork 222 includes a position-wise feed-forward layer 232, the decoder subnetwork can also include a residual connection layer that combines the outputs of the position-wise feed-forward layer with the inputs to the position-wise feed-forward layer to generate a decoder position-wise residual output and a normalization layer that applies layer normalization to the decoder position-wise residual output. These two layers are also collectively referred to as an "Add & Norm" operation. The outputs of this normalization layer can then be used as the outputs of the decoder subnetwork 222.

At each generation time step, the linear layer 224 applies a learned linear transformation to the output of the last decoder subnetwork 222 in order to project the output of the last decoder subnetwork 222 into the appropriate space for processing by the softmax layer 226. The softmax layer 226 then applies a softmax function over the outputs of the linear layer 224 to generate the probability distribution (output probabilities) 234 over the possible network outputs at the generation time step. The decoder 210 can then select a network output from the possible network outputs using the probability distribution, to output final result 204.

According to aspects of the technology, variations on the Transformer-type architecture can be used. These may include T5, Bidirectional Encoder Representations from Transformers (BERT), Language Model for Dialogue Applications (LaMDA), Pathways Language Mode (PaLM) and/or Multitask Unified Model (MUM) type architectures. These models may be trained and/or fine-tuned using reinforcement learning using human feedback ("rlhf") that is more likely to generate the response that human raters like the most (i.e., rate the highest). To enhance system robustness, utterance and context encoders can have additional dense layers to capture information in the embedding space. Other types of neural network models may also be employed in different architectures.

Textual Effect Approaches

FIG. 3A illustrates an example 300 of how a trained LLM system for caption modification or other textual modification can function. As shown, LLM 302 takes as input the selected text (e.g., an initial caption) 304 and a selected filter effect (306). An example of the input is shown in block 308. The LLM generates at least one text segment 308, and may optionally generate a score or other type of ranking 310. The ranking may be a metric generated by the system that indicates how closely the text segment conforms to the style associated with the selected filter. Or when multiple text segments are generated, it may indicate a relative ranking between the different text segments (e.g., "top ranked recommendation"). An example of the output is shown in block 312. Note that the electronic message application, word processing application or other application can operate by making a call to an API for a service that uses the LLM to provide suitable text segments. The service may be locally hosted on a client device such as a laptop, mobile phone, etc., or remotely hosted such as by a back-end application server.

Figure 3B:
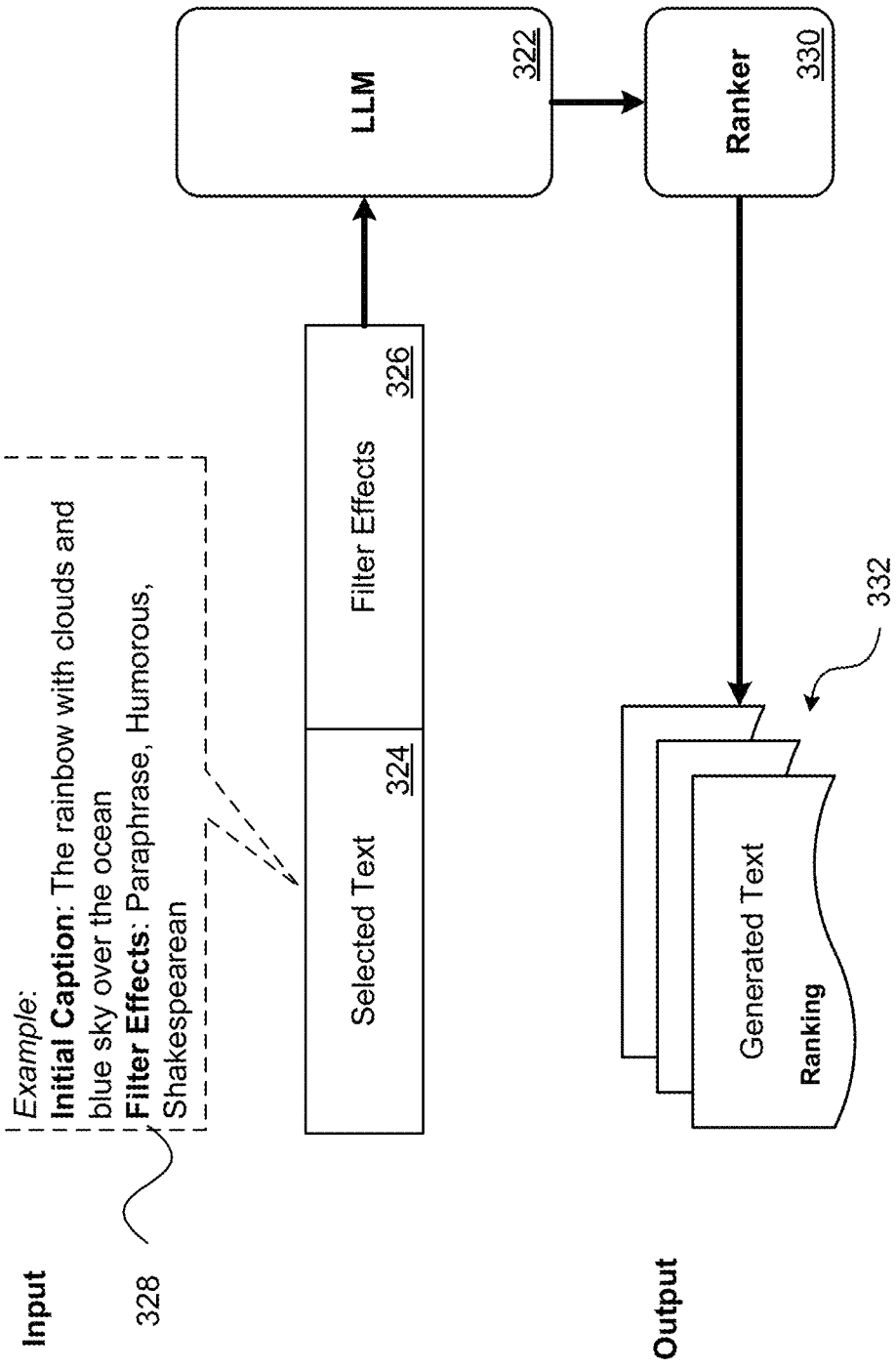

FIG. 3B illustrates another example 320. In this example, LLM 322 takes the selected text 324 as input, and also a set of filter effects 326, as shown by example 328. Here, the set of filter effects 326 may comprise only the effects selected by the user, may include a subset of filter effects, or be all of the filter effects. Once the LLM 322 generates the different text segments in accordance with each type of filter, a ranker 330 is configured to generate rankings for each text segment as noted above. The rankings may be numerical (e.g., "4/5"), textual (e.g., "top ranked recommendation") or graphical (e.g., ☺, ☺ or ☺). In one scenario, ranking can be performed on one or more of the following: (1) likeliness that the user would like the generated text (e.g., based on past posts by the user, and/or feedback collected from the user by the usage of this filter in the past), (2) likeliness that that audience of the users would like the text, which may be based on interaction metrics such as impressions and clicks collected from all audience of this feature, and (3) distance from the original input, in particular how related the output is to the given input.

Figure 4A:
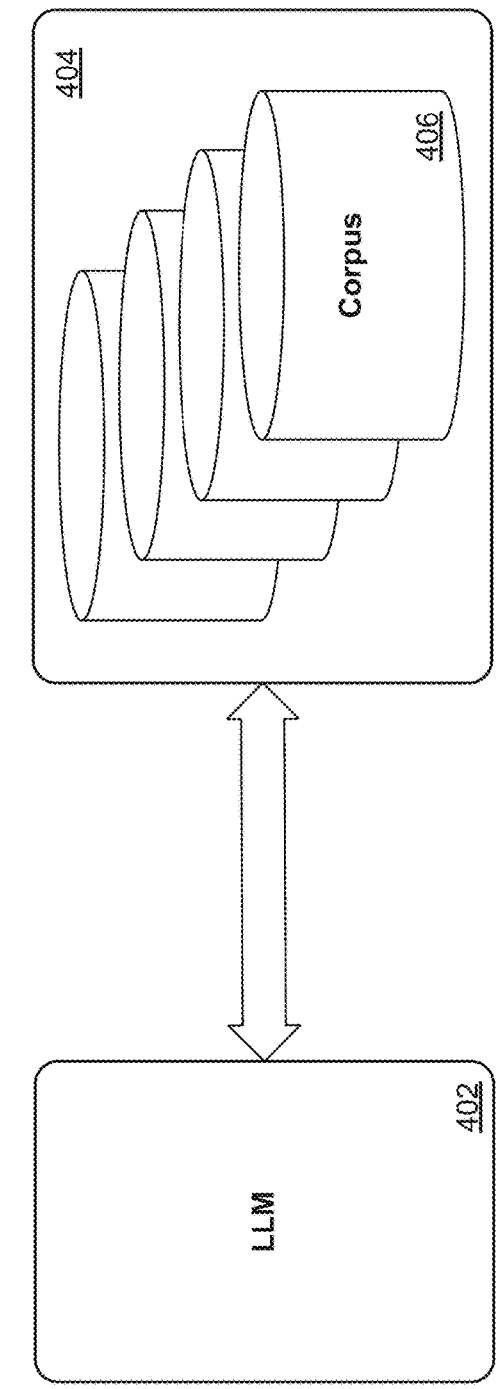
FIGS. 4A-B illustrate large language model (LLM) approaches in accordance with aspects of the technology.
Figure 4B:
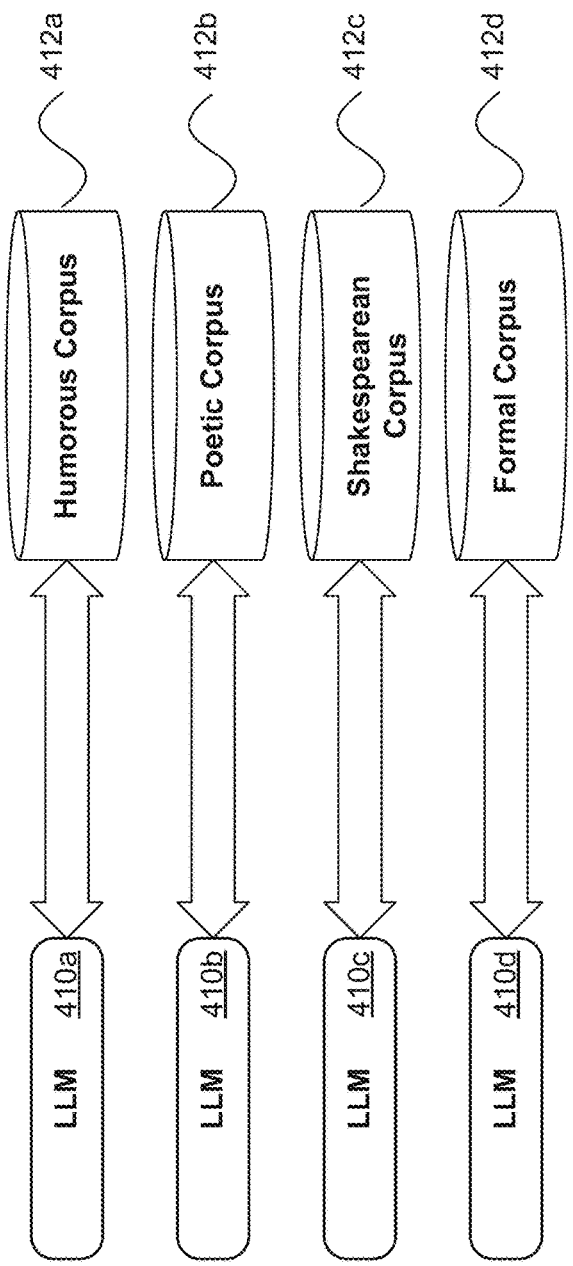

FIGS. 4A-B illustrate two LLM scenarios. As shown in FIG. 4A, one omnibus LLM 402 is trained according on a large set of information 404 that may include a number of individual corpuses 406. By way of example, each corpus 406 may correspond to a particular style associated with one textual filter. In contrast, as shown in FIG. 4B, the system may employ a number of separate LLMs 410 (e.g., 410a . . . 410d as shown). Here, each LLM 410 is trained only on a specific corpus 412 (e.g., 412a . . . 412d as shown). The one large LLM 402 may be suitable for certain tasks or as a back-end module that can be implemented on a cloud computing-type architecture or is otherwise run on a set of processing devices to generate all of the effects. In contrast, the individual LLMs 410 may be more suitable for use on client (user) devices, where each LLM is streamlined to perform its specific type of text generation with minimal overhead. Moreover, the LLMs 410 could be employed depending on the input data: only text, text+images, etc., or there could be specialized LLMs models that can critique or rate the output generated by the LLMs in the previous steps. The approach of FIG. 4B may also be beneficial as individual LLMs may be more easily updated based on newer information in the respective corpus and/or when a new LLM is added to the system to apply a new filter type.

Once the text segment(s) are generated, they may be post-processed. This may be done automatically by the system, or via manual editing by the user. By way of example, the system may confirm that the generated text is proper and responsible to show the user (e.g., does not include words or phrases that may be construed as incorrect or inappropriate). Alternatively or additionally, the system may confirm that any facts presented in the text are true. In other words, the post-processing may perform some level of validation prior to displaying the generated text.

Figure 5:
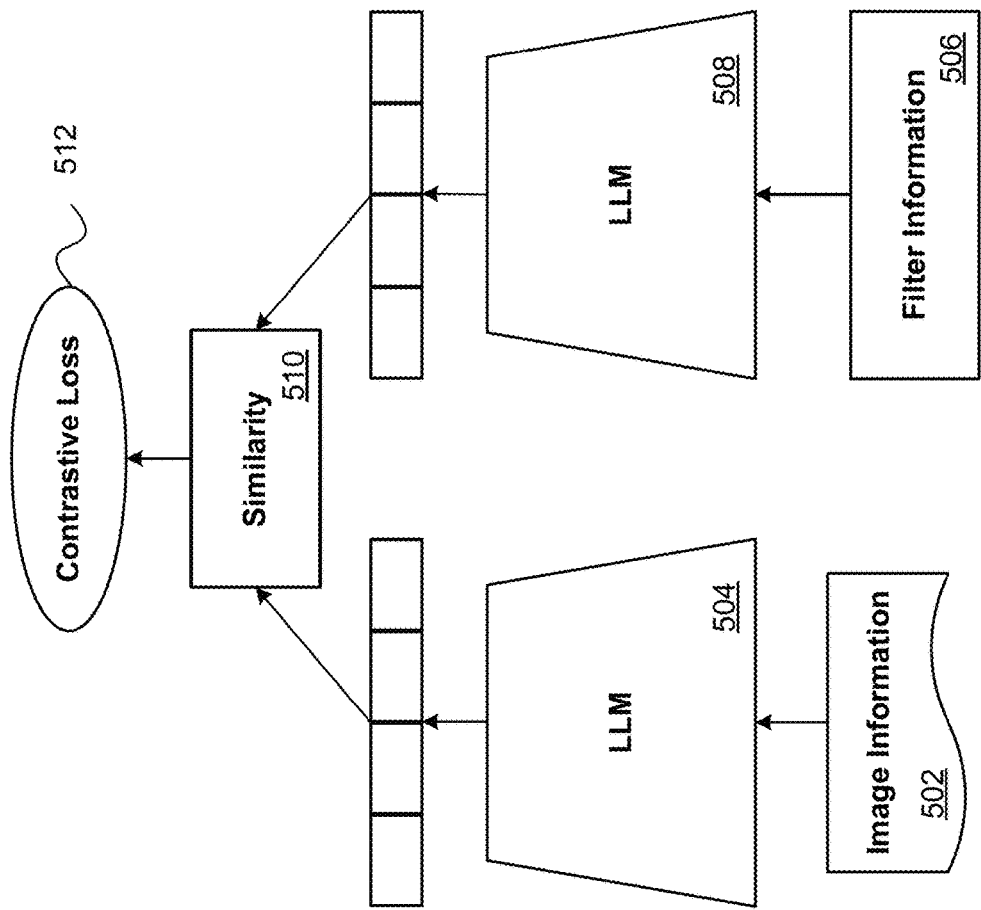
FIG. 5 illustrates an LLM arrangement for use in accordance with aspects of the technology.

According to another aspect of the technology, text could be generated by the model based on the image itself, with or without any user input such as initial caption 116. FIG. 5 illustrates one approach 500 to this aspect. Here, the technology may use a dual encoder model having two neural net towers, one to encode the image-related information and one to encode according to the filter(s). This figure illustrates one way for tuning a general dual encoder model. Here, image information 502 is input to a first LLM encoder (image encoder 504), and filter information 506 is input to a second LLM encoder (filter encoder 508). The outputs from each encoder 504, 508 are applied to a similarity module 510, which is used to generate a contrastive loss 512. The contrastive loss can then be used to train the dual encoder model. This approach can be extended by using the LLM architecture as a textual encoder that processes the image information, filter information, contextual information and/or any user-generated information, which may include an initial caption or other textual input. In this case the text based on a given filter type can be generated by extracting and then projecting a suitable activation layer from the model.

According to yet another aspect of the technology, another neural network architecture could be used to extract a description from the input image, and use the extracted description as input to the LLM in order to generate text according to one or more filters as discussed above. In one example, encodings from a generative adversarial network (GAN') could be coupled with the decoder from the LLM's to generate text from the image.

Figure 6A:
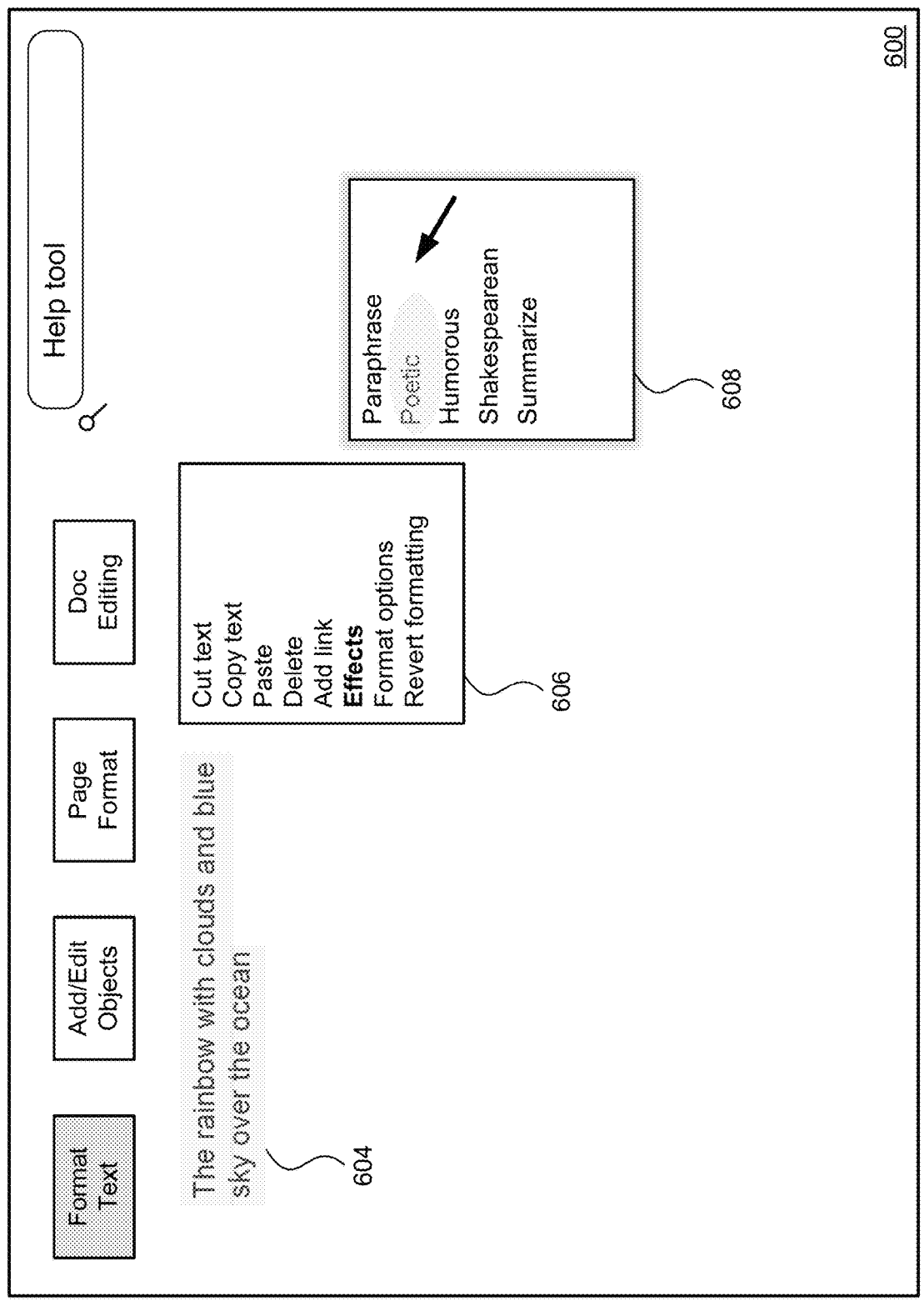
FIGS. 6A-B illustrates an example for a word processing application in accordance with aspects of the technology.
Figure 6B:
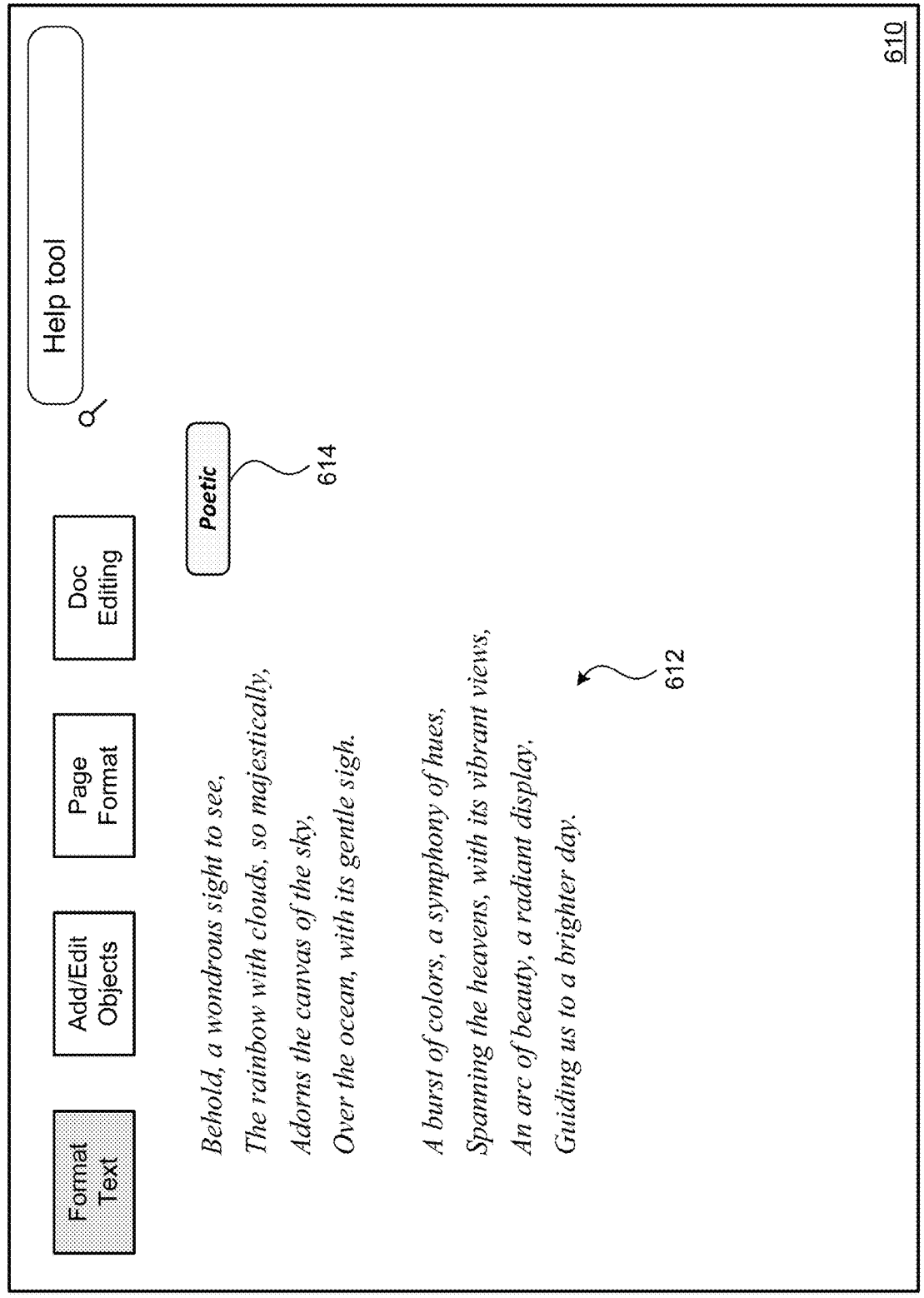

The approaches discussed herein can be used in a wide variety of applications and services. This includes social media, chat or text apps, as well as email, word processing, presentation, web browsing, photo sharing, greeting card generation, video apps, etc. FIG. 6A illustrates one example 600 for a word processing application. In this example, a text document 602 includes selected text 604. Here, when the Format Text option is selected, a drop-down or popup box 606 may present a set of general formatting options. One option can include Effects, which, when selected or hovered over can open a sub-menu 608 with different text effect options. As shown, the cursor is pointing to the Poetic option, which is highlighted. Upon selection of one effect (or multiple effects), the system generates the text variations in accordance to the approaches herein. FIG. 6B illustrates a screen 610 with a sample text variation 612. Here, the GUI may include a chip or other indicia 614 to indicate the selected variation. Note that in this type of scenario, there may be no image that is associated with the text.

Figure 7A:
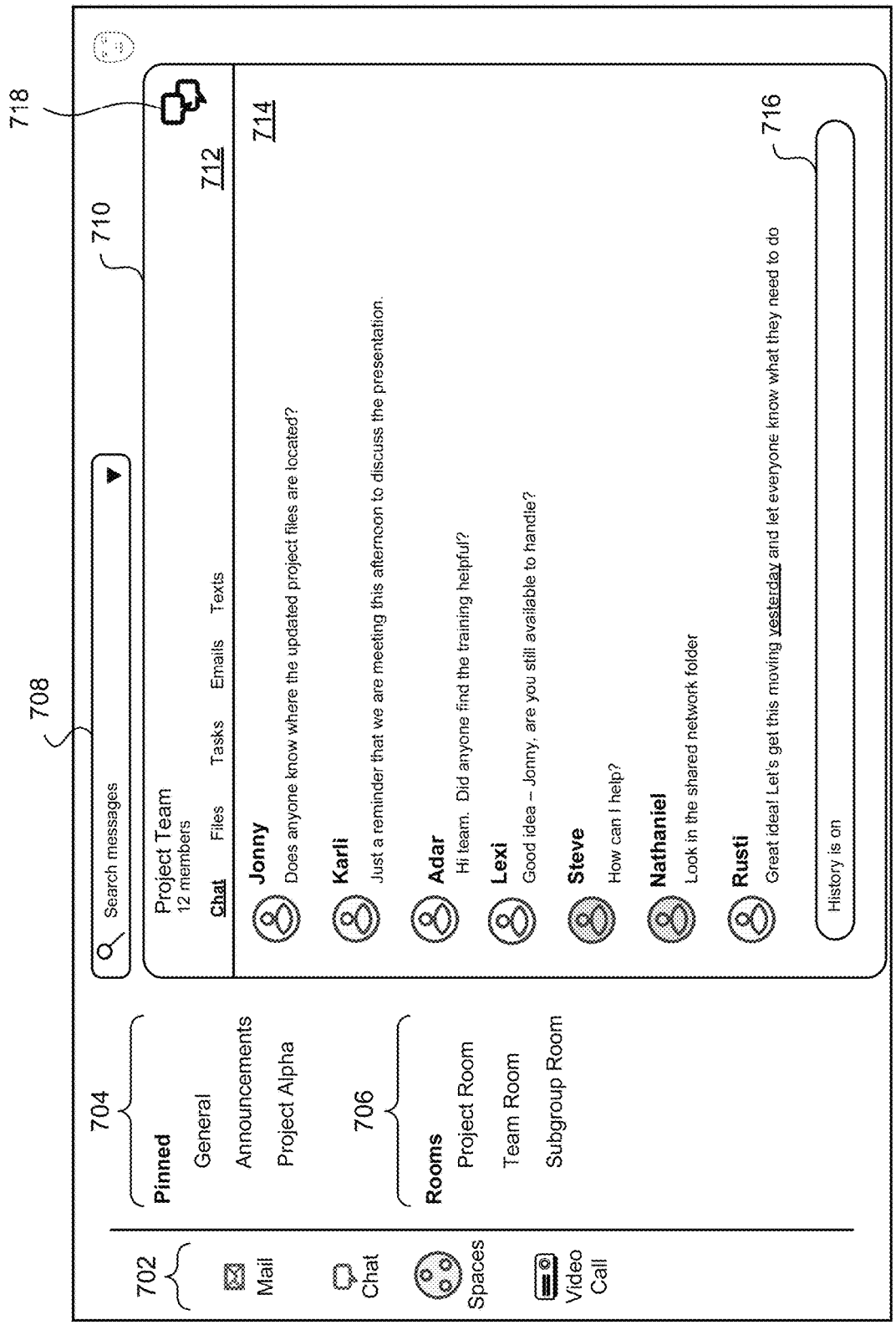

FIG. 7A illustrates features of an example electronic messaging application that supports image-like effects as discussed herein. As shown in view 700 of FIG. 7A, a first area 702 of the user interface can include links to different messaging options, such as email, chat, breakout rooms or other spaces, and/or a video call (videoconference) as shown. Other messaging options may be provided in addition or alternatively to any of these, including text messaging or collaborative apps. Adjacent to area 702, the user interface may include other areas for presentation to the user, including a pinned area 704 for any links that should remain displayed on the GUI, as well as a rooms area 706, which (if used) would list specific rooms accessible to or chosen by the user. A search toolbar 708 may enable the user to search through one or more specific types of messages (e.g., emails, chats, or both emails and chats).

In this example, the user interface also includes area 710, which may present a list of chats, files, tasks or other content (e.g., emails or texts) to the user. Here, one section 712 of the area 110 allows for selection of the types of content to list, while another section 714 presents at least a subset of the listed content. A scroll bar or other tool may allow the user to see hidden parts of the list (e.g., if there are too many chats to display given the available display size). This section may also include a text field 716 that enables the user to type a new message and add it to a conversation. Or the user can select icon 718 to create a message.

FIG. 7B illustrates an example UI screen 720 for presentation of a message. Here, section 722 includes the different communication options (e.g., chat, email, text), videoconference, etc.) and/or files (e.g., word processing document, presentation, etc.) that can be selected. In this example, a chat option has been selected, and section 722 also shows the different people that can be included in the chat. Section 724, which is presented adjacent to section 722, includes a first area providing information 726 identifying the group of people included in the communication and the type of communication 728 (here, an icon indicating a chat message). Section 724 also includes a second area for the information to be communicated, such as image 730 and accompanying text box 732. An editing tool bar 734 may provide standard text editing options (e.g., undo/redo, font style, font size, bold/italics/underlining), as well as an effects option. When the effects option is selected, a popup window 736 may be presented with the various textual effects filters (e.g., Paraphrase, Poetic, Humorous, Shakespearean, Summarize, etc.). In one scenario, the effects for an enterprise chat application may be different, such as: formalize, polite, rephrase, shorten or add context, etc. Upon selection of one such filter, the system generates a variation of the input text and presents it in the text box 732. In an alternative UI, an image may not be present. In that case the effects may just be based on text.

Example Computing Architecture

Figure 8A:
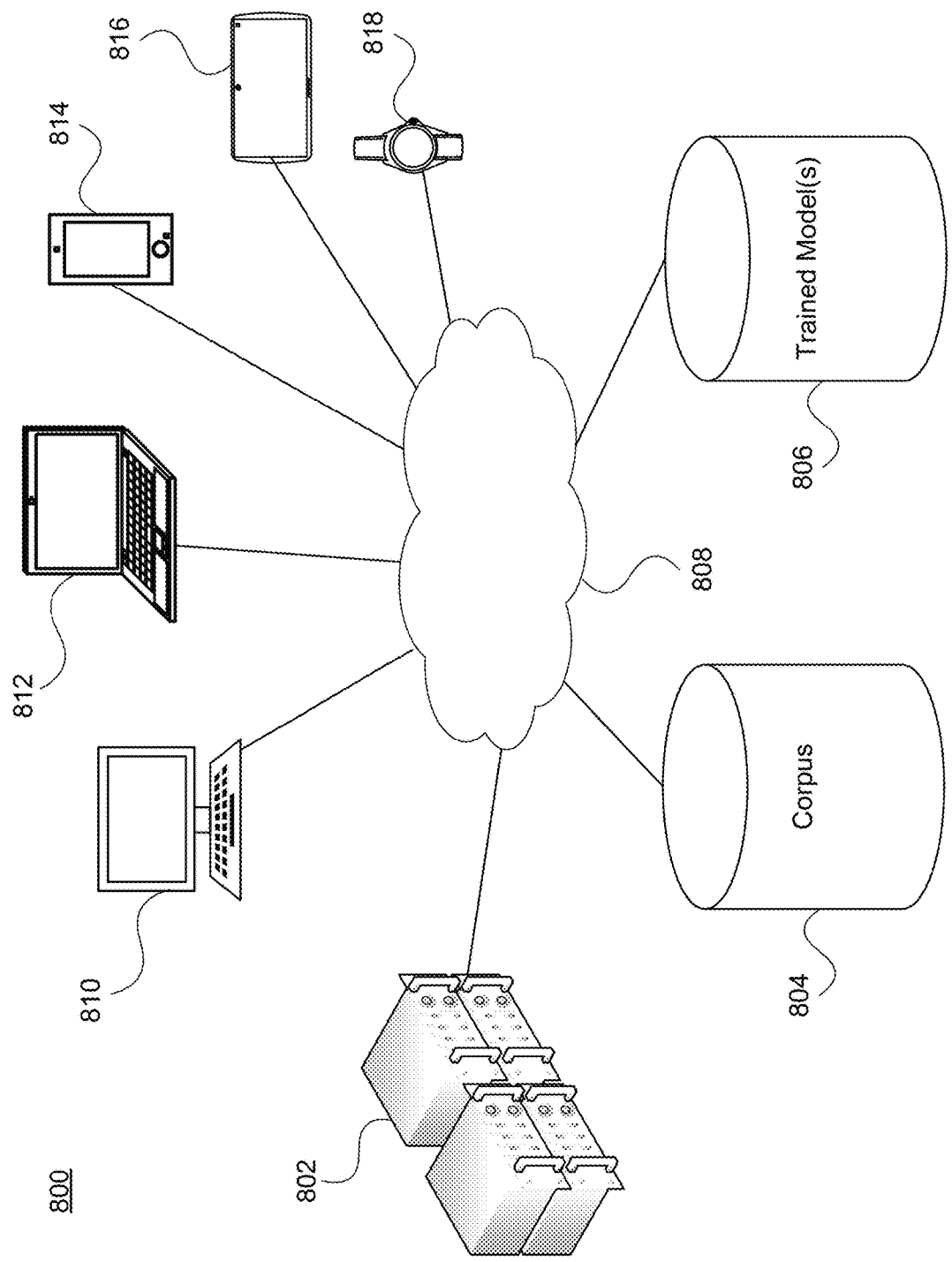
FIGS. 8A-B illustrate a system for use with aspects of the technology.
Figure 8B:
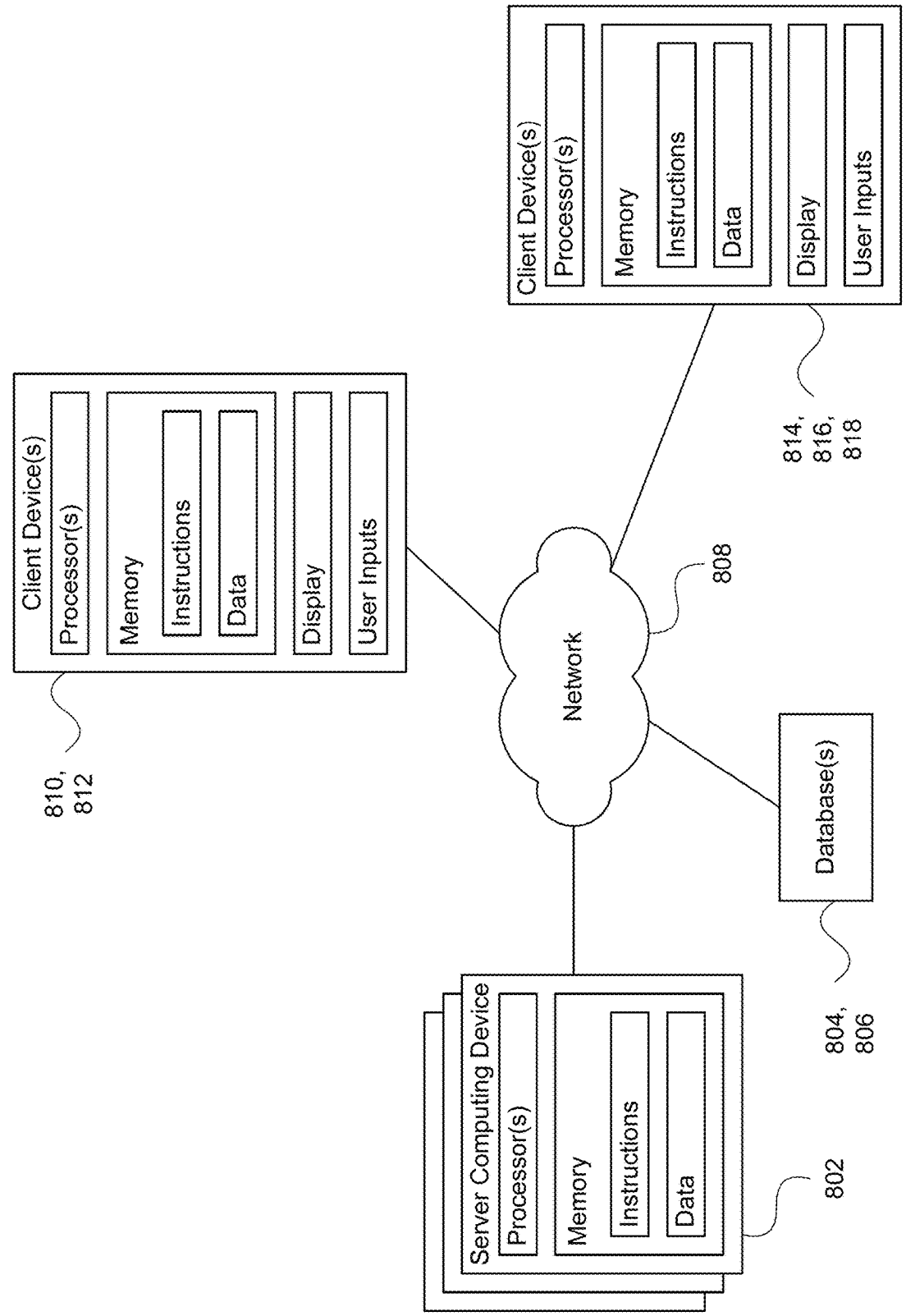

The image-like effects technology discussed herein may be trained on one or more tensor processing units (TPUs), CPUs or other computing in accordance with the features disclosed herein. One example computing architecture is shown in FIGS. 8A and 8B. In particular, FIGS. 8A and 8B are pictorial and functional diagrams, respectively, of an example system 800 that includes a plurality of computing devices and databases connected via a network. For instance, computing device(s) 802 may be implemented as a cloud-based server system. Databases 804, and 806 may store, e.g., a corpus of information and/or trained LLMs, respectively. The server system may access the databases via network 808. Client devices may include one or more of a desktop computer 810 and a laptop or tablet PC 812, for instance that present a particular caption or other text from a user, and/or to view the text variations provided by the system in accordance with a given neural network arrangement as discussed here, which could be provided to the user via a web-based service, app or other program. Other client devices may include handheld devices including a personal communication device such as a mobile phone or PDA 814 or a tablet 816. Another example is a wearable device 818 such as a smartwatch (or head-mounted display device).

As shown in FIG. 8B, each of the computing devices 802 and 810-818 may include one or more processors, memory, data and instructions. The memory stores information accessible by the one or more processors, including instructions and data (e.g., models) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs, TPUs, graphical processing units (GPUs), etc. Alternatively, each processor may be a dedicated device such as an ASIC or other hardware-based processor. Although FIG. 8B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 802. Accordingly, references to a processor or computing device will be understood to include references to a collection of processors or computing devices or memories that may or may not operate in parallel.

The computing devices may include all of the components normally used in connection with a computing device such as the processor and memory described above as well as a user interface subsystem for receiving input from a user and presenting information to the user (e.g., text, imagery, videos and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-related computing devices (e.g., 810-818) may communicate with a back-end computing system (e.g., server 802) via one or more networks, such as network 808. The network 808, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 802 may include one or more server computing devices that are capable of communicating with any of the computing devices 810-818 via the network 808. The computing device 802 may implement a back-end server (e.g., a cloud-based image caption server), which receives information from desktop computer 810, laptop/tablet PC 812, mobile phone or PDA 814, tablet 816 or wearable device 818.

As noted above, the application used by the user, such as a word processing or messaging application, may utilize the technology by making a call to an API for a service that uses the LLM to provide the text segments. The service may be locally hosted on the client device such as any of client devices 810, 812, 814, 816 and/or 818, or remotely hosted such as by a back-end server such as computing device 802. In one scenario, the client device may provide the captioning or other textual information but relies on a separate service for the LLM. In another scenario, the client application and the LLM may be provided by the same entity but associated with different services. In a further scenario, a client application may integrate with a third party service for the baseline functionality of the application. And in another scenario, a third party or the client application may use a different service for the LLM. Thus, one or more LLMs may be provided by various entities, including an entity that also provides the client application, a back-end service that can support different applications, or an entity that provides such models for use by different services and/or applications.

Resultant information (e.g., caption or other textual variants) or other data derived from the approaches discussed herein may be shared by the server with one or more of the client computing devices. Alternatively or additionally, the client device(s) may maintain their own databases, models, etc. Thus, the client device(s) may locally process text to produce variants in accordance with the approaches discussed hereon. Moreover, the client device(s) may receive updated LLMs from the computing device 802 or directly from database 806 via the network 808.

EXEMPLARY METHOD

FIG. 9 illustrates an exemplary method 900 for a system in view of the above discussion. At block 902, the method includes identifying, by one or more processors of a computing system, an initial text caption associated with an image presented in a graphical user interface of an application. At block 904 the method includes determining, by the one or more processors, a filter effect to be applied to the initial text caption. At block 906, the method includes applying, by the one or more processors, the filter effect to a trained large language model to generate one or more textual variations of the initial text caption. And at block 908, the method includes transmitting, by the one or more processors for presentation in the application, the one or more textual variations for display along with the image. The one or more textual variations are configured to replace display of the initial text caption.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method, comprising:
identifying, by one or more processors of a computing system, an initial text caption associated with an image presented in a graphical user interface of an application;
determining, by the one or more processors, a filter effect to be applied to the initial text caption;
applying, by the one or more processors, the filter effect to a trained large language model to generate one or more textual variations of the initial text caption; and
transmitting, by the one or more processors for presentation in the application, the one or more textual variations for display along with the image, wherein the one or more textual variations are configured to replace display of the initial text caption.

2. The method of claim 1, wherein the initial text caption is identified according to text input received from a user of the application.

3. The method of claim 1, wherein the initial text caption is identified according to a previously detected writing style associated with a user.

4. The method of claim 1, wherein the initial text caption is identified based on metadata of the image.

5. The method of claim 1, wherein determining the filter effect to be applied is based on identification of a filter selection in the graphical user interface of the application.

6. The method of claim 1, wherein the filter effect includes at least one textual style from a set of distinct textual styles.

7. The method of claim 6, wherein the set of distinct textual styles includes at least one of a humorous style, a poetic style, a Shakespearean style, a formal style, or a paraphrase style.

8. The method of claim 6, wherein the large language model is trained according to each distinct textual style of the set.

9. The method of claim 6, wherein:
the trained large language model comprises a plurality of large language models, each of the plurality of large language models being trained on a different one of the set of distinct textual styles.

10. The method of claim 1, wherein the filter effect includes a plurality of sub-filter effects that are variants of a general filter effect.

11. The method of claim 1, wherein the large language model is trained or fine-tuned according to reinforcement learning using human feedback.

12. The method of claim 1, wherein:
the one or more textual variations is a plurality of textual variations; and
the method further comprises ranking the plurality of textual variations.

13. The method of claim 12, further comprising generating, for presentation in the application, rankings for each of the plurality of textual variations to be displayed in the graphical user interface.

14. The method of claim 12, wherein the ranking is performed by the large language model.

15. The method of claim 1, further comprising performing post-processing on the one or more textual variations for validation prior to the transmitting.

16. The method of claim 1, further comprising:
extracting, by the one or more processors, a description of the image,
wherein the generation of the one or more textual variations is based on the description of the image.

17. A processing system, comprising:
memory configured to store one or more of imagery, caption information or a trained large language model; and
one or more processors operatively coupled to the memory, the one or more processors being configured to:
identify an initial text caption associated with an image presented in a graphical user interface of an application;
determine a filter effect to be applied to the initial text caption;
apply the filter effect to the trained large language model to generate one or more textual variations of the initial text caption; and
transmit, for presentation in the application, the one or more textual variations for display along with the image, wherein the one or more textual variations are configured to replace display of the initial text caption.

18. The processing system of claim 17, wherein determination of the filter effect to be applied is based on identification of a filter selection in the graphical user interface of the application.

19. The processing system of claim 17, wherein the filter effect includes at least one textual style from a set of distinct textual styles.

20. The processing system of claim 17, wherein the filter effect includes a plurality of sub-filter effects that are variants of a general filter effect.

21. The processing system of claim 17, wherein:
the one or more textual variations is a plurality of textual variations; and
the one or more processors are further configured to rank the plurality of textual variations.

* * * * *